March 4, 1952 F. F. CRANDELL ET AL 2,587,601
DIRECT READING COLOR TEMPERATURE METER
Filed Sept. 17, 1948 2 SHEETS—SHEET 1
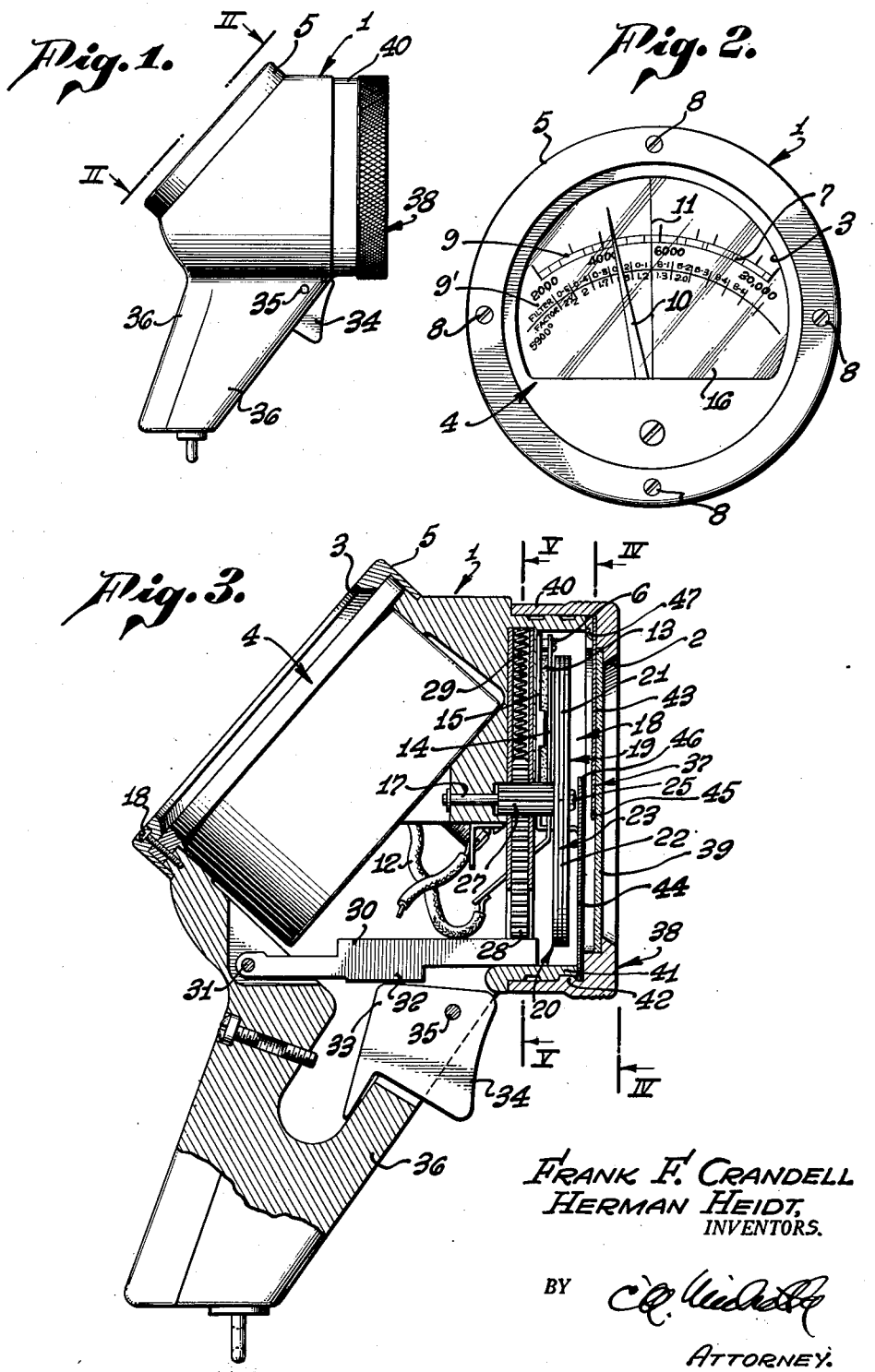
FRANK F. CRANDELL
HERMAN HEIDT,
INVENTORS.
BY
ATTORNEY.

March 4, 1952   F. F. CRANDELL ET AL   2,587,601
DIRECT READING COLOR TEMPERATURE METER
Filed Sept. 17, 1948   2 SHEETS—SHEET 2
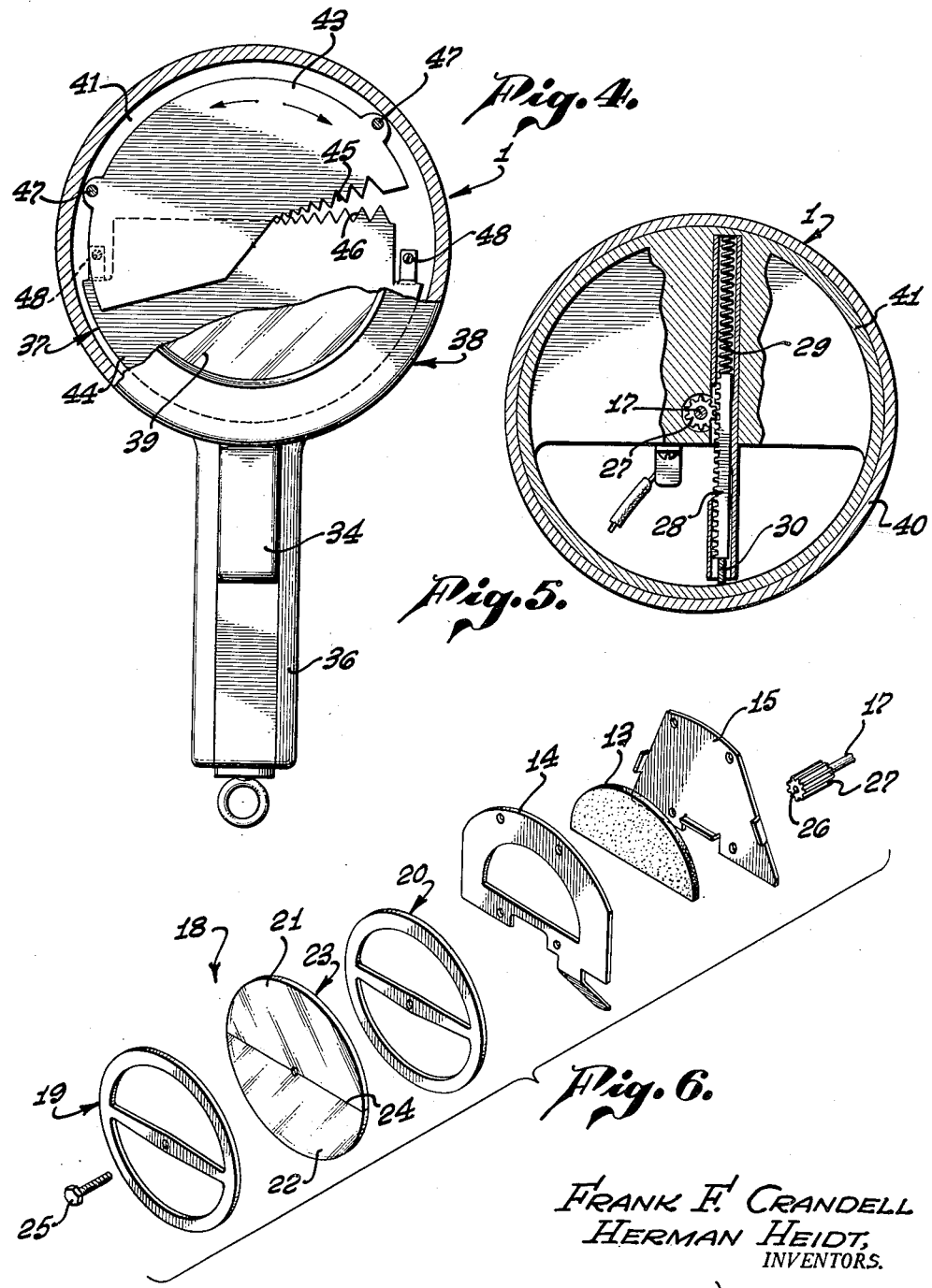

Patented Mar. 4, 1952

2,587,601

UNITED STATES PATENT OFFICE 2,587,601

DIRECT READING COLOR TEMPERATURE METER

Frank F. Crandell, Pasadena, and Herman Heidt, Inglewood, Calif., assignors to Photo Research Corporation, San Fernando, Calif., a corporation of California Application September 17, 1948, Serial No. 49,706

4 Claims. (Cl. 88—22.5)

Generally speaking, this invention pertains to apparatus for rapidly and accurately determining the color temperature of light. More particularly, it pertains to a direct reading color temperature meter arranged for direct reading of a color temperature in degrees Kelvin in a manner whereby the light, the color temperature of which is being determined, does not interfere with or tend to obscure the view of the indicating meter and cooperating scale carrying indicia calibrated in degrees Kelvin. Furthermore, the apparatus of the present invention is provided with simple and novel means for rapidly and accurately determining the color temperature of light without the use of computers or the necessity of visually comparing colors.

Light from different sources may be of the same intensity or brightness and still differ greatly in color or in the spectral composition of the light in terms of wave length. For example, light from the ordinary incandescent lamp, wherein the light source is an incandescent filament electrically heated, contains a relatively large proportion of relatively long wave lengths in the visible spectrum which may be described generally as being in the orange and red region of the visible spectrum. Ordinary daylight varies in spectral composition in accordance with the position of the sun and the time of the day. However, generally speaking, it has a higher color temperature than incandescent light having a larger proportion of relatively short wave length spectral components than light from an incandescent filament lamp. North skylight varies in spectral composition in accordance with the haziness of the sky, but generally speaking, it can be said that it has a relatively high color temperature having a much higher proportion of low wave length spectral components than light from an incandescent filament lamp or even ordinary sunlight.

Color temperature is an indication of the spectral composition of light and is measured in degrees Kelvin. It is the "black-body" radiation temperature which would produce a color matching the light in question. If a "black-body" is heated to a certain temperature in degrees Kelvin, the light emitted therefrom will have a spectral composition virtually corresponding to that of light from another source having the same color temperature.

The determination of color temperatures is of great importance in color photography, since all color films are designed to produce color images in virtually true color balance only when the subject is photographed with light of a predetermined color temperature. For example, "Kodachrome" (a color film manufactured by Eastman Kodak Company) is designed to give true color rendition under noon daylight illumination, but at three-thirty p. m. the images may show an overall orange-red tint, due to the low color temperature of the afternoon light. The same situation would prevail if "Kodachrome" were exposed under incandescent filament lamp lighting conditions because of the low color temperature of the light emitted thereby. Therefore, it is vitally important for a color photographer, particularly a motion picture color photographer, because of the great cost involved, to be able to accurately and rapidly determine color temperature under various lighting conditions.

The apparatus of the present invention permits a photographer to rapidly and easily obtain the color temperature of light being used upon his subject so that he may either select a color film best suited for true color rendition for subjects illuminated with such light, or knowing the characteristics of his available film, the photographer may compensate for the deficiencies of the existing light by the use of compensating filters in his camera, or the photographer may compensate for the deficiencies of the existing light by varying or changing the voltage applied to the filaments of the light sources or by supplementing said light with additional light of different spectral composition, thus producing a combined light of a suitable color temperature.

Some prior art methods of determining color temperatures depend upon the matching of colors visually. Such methods are unsatisfactory because the eyes of most people differ in color perception and an individual's eyes may differ from hour to hour in color perception. Eye fatigue and physiological compensation introduces errors. Other prior art systems and methods are complex in that they involved the use of numerous meters, photocells, electrical compensating circuits, and also required the use of special computers, tables, etc. Such systems and methods were not accurate, were cumbersome, and were subject to many defects tending to introduce error or even failure in the system.

The apparatus of the present invention permits a photographer to obtain a positive direct reading in degrees Kelvin of the color temperature of light being examined by the use of a single meter and without the necessity of employing computers.

Generally speaking, the present invention comprises a direct reading color temperature meter including a photocell and filter means including two light filters arranged to modify the character of light received by the photocell in two different selected manners and arranged for manual selective movement into operative position in front of the photocell. Means are also provided for controlling the quantity of light passing through the selected filter and received by the photocell. Electric meter means electrically connected to the photocell is arranged for viewing at an angle to the mean direction of light received by the photocell, thus simplifying reading of indicia carried by a meter scale cooperating with a movable meter index actuated by the electric meter. A reference point is also provided on the scale in a selected position with respect to the indicia carried by the scale.

In the preferred form of the present invention, indicia carried by the scale is in degrees Kelvin and the reference point is located between the end points to the indicia. In the preferred form of the invention, the filter means, including two different filters, is of disc shape and each of the filters is of semicircular shape arranged contiguously so as to form the disc-shaped combined filter means. This combined filter means cooperates with manually actuatable means for selectively causing the rotation of the filter means so as to operatively position one or the other of the semicircular filters with respect to the photocell. In the preferred form of the invention, the means for controlling the quantity of light impinging the photocell comprises a diaphragm including two virtually semicircular sheet members arranged for rotation about a common center and lying in closely adjacent, virtually parallel planes with each of said members being provided with a lateral, serrated edge arranged to cooperate with each other to form a variable area, serratedly edged, virtually sector-shaped opening the size of which may be adjusted by manual relative rotation of one of said members with respect to the other. The preferred form of the present invention also includes a downwardly depending handle for facilitating the carrying and aiming of the color temperature meter and includes trigger means arranged to selectively position either of the filters in operative position with respect to the photocell.

It can be seen from the above general description of a preferred form of the present invention that the color temperature of light may be very quickly and readily determined through the use of the present invention by aiming the color temperature meter in a direction so as to receive the light to be tested through the variable area diaphragm and through one of the filters (generally, although not necessarily, a filter selectively passing light in the red region of the spectrum). The variable area diaphragm means may be manually adjusted until the index carried by the electric meter is at the reference point. Then the trigger may be actuated, which causes the removal of the first filter and the placing in operative position of the other filter (usually, although not necessarily, a filter selectively passing light in the blue region of the spectrum) and the color temperature in degrees Kelvin may be directly read by observing the indicia underlying the movable index of the electric meter. The whole operation just described is exceedingly simple and rapid and has none of the disadvantages hereinbefore mentioned in connection with the prior art color temperature meters.

With the above points in mind, it is an object of the present invention to disclose and provide a simple, substantially foolproof, accurate apparatus for determining and rendering directly readable the color temperature of light.

Other and allied objects will become apparent from a careful study, examination, and perusal of the illustrations, specification and appended claims. To facilitate understanding, reference will be had to the following drawings, in which:

Fig. 1 is a side elevational view of an illustrative embodiment of the present invention.

Fig. 2 is a view taken in the direction of arrows II—II of Fig. 1 showing the electric meter, scale, indicia and reference point.

Fig. 3 is an enlarged sectional view of the apparatus of the present invention from an aspect similar to that of Fig. 1.

Fig. 4 is a sectional view taken in the direction of the arrows IV—IV of Fig. 3.

Fig. 5 is a partial sectional view taken in the direction of the arrows V—V of Fig. 3.

Fig. 6 is an exploded perspective view of the photoelectric cell, filter means and pinion for actuating same, employed in the preferred form of the present invention.

The preferred form of the present invention illustrated in the drawings comprises a hollow housing 1 which in the example illustrated is of cylindrical form, provided with a light-admitting port, indicated generally at 2 in one end thereof and a meter port, indicated at 3, in the other end thereof. It should be noted that the meter port 3 is inclined at an angle, preferably, although not necessarily, approximately 45° displaced from the orientation of the light-admitting port 2, making it possible for a photographer to view the meter 4 positioned therein without looking into the light, the color temperature of which is being observed, which would tend to make it difficult to read the meter.

The meter 4 may be any desired type of microammeter and will not be specifically described, since such are well known in the art. In the example illustrated, a retaining ring 5 carrying a transparent window 16 is arranged in position over a scale 7 carried by the meter and is threadedly fastened to the housing 1 by suitable screw means 8. The scale 7 is provided with suitable indicia indicated generally at 9 arranged to cooperate with a pivotally movable index 10 which is arranged to move in response to electrical energization of the meter 4. It should be noted that the indicia 9 are in degrees Kelvin and a reference point, indicated at 11, is located between the end points of the indicia 9. The purpose of the reference point 11 will be explained more fully hereinafter.

It is to be noted that, in the illustrated example indicia 9 of scale 7 cover a range of from 2000° K. to 30,000 K., with 6000° K. near the middle of the scale. The distribution along the length of the scale is such that equal angular deflections of the index member 10 along the scale produce (or respond to) equal visual changes and are correlated to equal need for correction in the film and progressive changes in correction filters.

The electric meter 4 is connected by suitable leads 12 to a photocell 13 which is of semicircular form and is carried by a semicircularly apertured front bracket member 14 and a rear bracket member 15 arranged to be held in rigid engagement with the front and back sides of the photocell 13 by screw means 6. The photocell is of the photronic, barrier-layer type, such as a selenium or copper oxide photovoltaic cell. However, various other types of photocells may be utilized.

The forward end of a rotatable shaft 17 fixedly carries disc-shaped filter means indicated generally at 18 in operative position in front of the semicircular aperture in the front photocell supporting bracket 14. The filter means, indicated generally at 18 in Fig. 3, is shown more fully in exploded form in Fig. 6 and comprises an annular front supporting member provided with a centrally apertured cross bar, indicated generally at 19, and a similar annular rear supporting member and centrally apertured cross bar indicated generally at 20, arranged to be clamped on the front and rear sides of two separate different filters 21 and 22 of semicircular form arranged contiguously so as to form a disc, indicated generally at 23. The two filters 21 and 22 forming the disc-shaped combined filters 23 are clamped between the front supporting member 19 and the rear supporting member 20 with the cross bars thereof in parallel relationship and aligned with the line of contact indicated at 24 between the two different filters 21 and 22, whereby one of the filters will be accessible through one of the semicircular openings in the front supporting member 19 and the other filter will be accessible through the other semicircular aperture in the front supporting member 19, when the combined filter means is in assembled relationship, which is attained by inserting a screw 25 through the central apertures in the front supporting member 19, the composite filter disc 23 and the rear supporting member 20 into an interiorly threaded hole 26 in the outer end of the shaft 17. It can be seen that when the combined filter means 18 is in assembled position, as shown in Fig. 3, one of the semicircular filters 21 is immediately in front of the semicircular aperture in the front photocell supporting bracket 14, and filters any light received by the photocell 13. Preferably, though not necessarily, the filter means 21 (in the position shown in Fig. 3) is such as to selectively pass light in the red region of the spectrum, although this may be modified, if desired.

The shaft 17 carries a pinion 27 in engagement with a vertical rack 28. The vertical rack 28 is constrained to move in a vertical position only and is normally spring biased downwardly by means of a spring 29 into the position shown in Fig. 3, whereby the lower end of the rack 28 abuts the end of a lever member 30 which is pivotally mounted at 31 and carries a projection 32 on its underside and adjacent the midpoint of the lever 30 which is arranged to cooperate with a cam portion 33 of a trigger 34, which is pivotally mounted at 35 in a downwardly depending handle 36. It can be seen that normally before the trigger 34 is actuated, the filter 21, which as hereinbefore mentioned, is preferably a red filter, is in operative position in alignment with and filters the light received by the photocell 13 so that the light received thereby will be preponderantly red. Manual actuation of the trigger 34 causes the lever 30 to be pivoted in a counterclockwise direction about the pivot point 31, thus moving the rack 28 upwardly and rotating the pinion 27 in counterclockwise direction (as viewed in Fig. 5). This, of course, rotates the shaft 7 and attached filter means 18 in counterclockwise direction also. The arrangement of the lever 30, trigger 34 and rack 28 is such that actuation of the trigger 34 causes the rack 28 to be moved just enough to rotate the filter means 18 through 180°, thus completely removing the semicircular filter 21 from operating position and moving the semicircular filter 22 (which preferably, although not necessarily, is a blue filter) into the operative position formerly occupied by the red filter 21. When the trigger 34 is released, the biasing spring 29 will move the rack 28 downwardly to its former position, thus returning the pinion 27 and filter means 18 to their former positions and replacing the red filter 21 in its former operative position in front of the photocell 13.

Variable area diaphragm means is provided and is indicated generally at 37 in Fig. 3. Generally speaking, this comprises an annular member 38 carrying a central transparent window 39 for admitting light to the apparatus and provided with a rearwardly directed circular flange 40 arranged to fit over a forwardly directed flange 41 of slightly smaller dimensions which is a part of the housing 1 and forms the light-admitting port 2. The flange 40 is arranged for rotation with respect to the flange 41 and is retained thereon by suitable retaining means indicated at 42 which also may act to frictionally maintain the relative position of the outer rotatable flange 40 with respect to the inner flange 41.

The member 38 has attached to the inner side thereof parallel to and immediately behind the glass window 39, a downwardly projecting, virtually semicircular, thin sheet, opaque disc, indicated at 43, and the inner flange 41 has provided thereon an upwardly projecting, virtually semicircular, thin sheet, opaque disc 44. It should be noted that the two oppositely directed parallel opaque discs 43 and 44 overlap slightly at the center of the port 2 and that beginning at the center of each of the semicircular members and on the same side thereof (as best seen in Fig. 4) each of said opaque members is provided with a serrated edge arranged for cooperation with each other. These serrated edges are indicated at 45 and 46.

It will readily be understood that the variable area diaphragm shutter, as shown in Fig. 4, may be opened to any desired extent by merely rotating the outer member 38 in a counterclockwise direction with respect to the inner member 41, since upper opaque disc 43 is affixed by screw means 47 to the outer member 38 and the lower opaque disc 44 is affixed by screw means 48 to the inner member 41.

It will be noted that the variable area opening formed by relative rotation of the outer member 38 in a counterclockwise direction with respect to the inner member 41 is virtually of sector form, with the sector, however, having serrated edges, and this sector distributes the light over a portion of photocell 13 without causing fatigue of the central portion of the cell (as when an iris diaphragm is used). Moreover, the distribution of light obtained by a practically closed shutter of the character described minimizes errors which may be caused by local response variations or imperfections of the cell. The serrated edges, cooperating during the closing stages, permit finer and more accurate adjustment.

The operation of the device may be described as follows. The photographer grasps the handle 36 and aims the port 2 in a manner such as to receive the light, the color temperature of which is to be determined. The red filter 21 is in operative position and the received light passes therethrough and impinges the photocell 13, causing current to flow through the leads 12 to the microammeter 4, thus actuating the needle or index pointer 10 to some point with respect to the indicia 9. The diaphragm 37 is then adjusted by relative rotation of the outer member 38 with respect to the housing 1 until the position of the needle 10 coincides with the reference point 11, at which position the diaphragm is maintained. Next, the trigger 34 is actuated, thus causing the red filter 21 to be rotated out of operative position in alignment with the opening in the diaphragm 37 and the photocell 13 and causing the blue filter 22 to move into said operative position. The blue light received by the photocell 13 causes the photocell to generate an electric current which repositions the microammeter needle 10 with respect to the indicia 9. The indicia 9 coinciding with the new position of the pointer 10 then indicates the color temperature of the light admitted through the port 2 in degrees Kelvin. Upon release of the trigger 34, the filter means 18 will rotate and reposition the red filter in an operative position, ready for a subsequent color temperature determination.

The angular position of the meter 4, scale 7, indicia 9 and pointer 10 with respect to the median direction of reception of light, the color temperature of which is to be determined, makes it possible for the photographer to read the color temperature on the scale without undesirable interference caused by the light, the color temperature of which is being measured. This occurs by reason of the fact that the photographer does not have to look directly toward the source of the light but reads the color temperature at an angle to the main source of light, thus minimizing the blinding that generally occurs in prior art exposure meters and the like.

The advantages and uses of the present invention in determining color temperature will be apparent from consideration of the following examples.

If, for instance, the meter has shown that the color temperature of the light is 3200° K. the photographer knows that the proper film to use in a film sensitized to give color balance for light of 3200° K. Such a film is commercially available and can be used for photographing the scene or subject without the use of compensating filters.

If, however, such film is not available and the photographer desires to use Kodachrome (which is balanced for light of 5900° K.) then during actual photographing he must use a compensating filter which will raise the color temperature of the light from 3200° to 5900° K. The required filter would transmit a sufficient amount of blue or short wave lengths and absorb a proportion of red or long wave lengths so as to produce total transmitted light of 5900° K.

In the event the color temperature of the light being used in photography was determined to be 12000° K. (in accordance with the method of my invention) and the picture was to be taken with an emulsion of film balanced for 5900° K. then an orange compensating filter would be used during photography, such filter being capable of absorbing the cold or blue wave lengths and transmitting sufficient warm or long wave lengths to transmit a total transmitted light of 5900° K.

When the device is used in photographic work (and not in pyrometry for industrial purposes) the ready selection of a compensating filter is facilitated by placing other scales and indicia in visual relationship to the needle 10. One such additional scale is shown in Fig. 2 at 9'. Such scale is identified as designed for use with film balanced for 5900° K. by carrying such notation at the left-hand end of the scale. Along the scale the upper notations relate to the filters to be used when the needle 10 is at an angular position traversing scale 9', and the lower notations specify the filter factor corresponding thereto. Two or three scales of this type, each corresponding to a specific film, may be used, thereby permitting the owner of the instrument to not only determine color temperature, but also immediately know what compensating filter to use with the film and the filter factor of such filter.

Having therefore determined the color temperature of the light and having selected the compensating filter to be used during photography, it is now only necessary to determine the exposure to be given the film. The exposure to be given may be best determined by the use of any standard suitable photo-electric or other exposure meter in the normal manner. The exposure so determined is of course modified or multiplied by the filter factor of the compensating filter used in the camera.

In a slightly modified form of device, an auxiliary manually movable ring may be carried by the housing adjacent the flange 40 of manually adjustable ring member 38. The housing may carry a reference point or arrow pointing to one edge of the auxiliary ring; such edge may carry indicia identifying various film speeds so that the operator may rotate the ring into position correlated to the speed of the film used by him. The opposite edge of such auxiliary ring may be in sliding contact with the edge of flange 40. Such opposite edge may carry indicia indicating "f" numbers or stops while the edge area of flange 40 may carry cooperatively related indicia indicating shutter speeds. Since member 38 (and flange 40) are manually adjusted to a fixed reference point position during determination of color temperature; this arrangement permits the operator to simultaneously determine his exposure factors in terms of lens opening and shutter speed.

Numerous modifications and variations of this invention not specifically described herein will be apparent to those skilled in the art and are intended to be comprehended and included herein. For example, the filter means may be modified considerably without departing from the spirit of the present invention, which is merely to provide two distinct filters of different spectral absorption characteristics selectively movable into the path of light impinging the photocell. The means for producing this movement may be modified within wide limits. Various types of diaphragms or light-admission controlling means other than that specifically described and illustrated herein may be employed; light polarizing elements capable of movement into crossed position may be used. The invention distinctly contemplates the use of a translucent, thin, semispherical light-gathering and integrating means placed over the light-admitting part of the device. The serrated edge illustrated in the diaphragm-type, light-admission means may be modified or dispensed with, if desired. The angular inclination of the electric meter and scale may be substantially modified. While this invention has been described as employing a red and a blue filter, it is not limited to such.

The examples described and illustrated herein are exemplary only and are not intended to limit the scope of the present invention, which is to be interpreted in the light of the appended claims only.

We claim:

1. In a portable direct reading color temperature meter, the provision of: a hollow housing provided with a light-admitting port at one end lying in a plane perpendicular to the axis of the housing; a viewing port at the other end of the housing lying in a forwardly inclined plane with respect to the axis of the housing; a handle extending downwardly from the side of the housing opposite to said viewing port; a single light-responsive meter positioned within the housing to receive light from the light-admitting port; a scale and a movable index operatively connected to the meter and lying beneath the inclined viewing port; two light filters mounted for rotation about a common axis and positioned between the light-admitting port and the meter; light-admitting means, including a rearwardly directed circular lip, carried by said housing in cooperative relation to the light-admitting port and adjustable by rotative engagement of said lip with adjacent edge margins of said housing; and means for selectively moving the light filters each into a position for varying the light impinging upon said meter, said means including a trigger carried by the handle, a pinion rotatable about the same axis as the light filters and operatively connected to the trigger, and a rack bar in meshed engagement with the pinion.

2. A color temperature meter as defined in claim 1 wherein the selectively movable means includes spring means between one end of the rack bar and a wall of the housing for normally biasing one light filter only into position before the light-responsive meter.

3. A color temperature meter as defined in claim 1 wherein pivoted lever means cooperatively connects the trigger and the rack bar, and wherein spring means normally biases said rack bar into one position for normally interposing only one light filter into light passing through the light limiting means.

4. In a portable direct reading color temperature meter the provision of: a hollow housing provided with a light admitting port at one end lying in a plane perpendicular to the axis of the housing; a viewing port at the other end of the housing lying in a forwardly inclined plane with respect to the axis of the housing; a handle extending from the side of the housing; a single light responsive meter positioned within the housing to receive light from the light admitting port; a scale and a movable index operatively connected to the meter and lying beneath the inclined viewing port; two light filters mounted for rotation about a common axis and positioned between the light admitting port and the meter; light admitting means carried by said housing in cooperative relation to the light admitting port and adjustable by rotation on said housing, said light admitting means including a rearwardly directed lip having cooperative engagement with adjacent edge margins of the housing; and means for selectively moving the light filters each into a position for varying the light impinging upon said meter, said means including a trigger carried by the handle, a rack bar operatively connected to the trigger, and a rotatable pinion in meshed engagement with the rack bar and operatively connected to the light filters.

FRANK F. CRANDELL.
HERMAN HEIDT.

REFERENCES CITED

The following references are of record in the file of this patent:

UNITED STATES PATENTS

| Number | Name | Date |
|---|---|---|
| 1,291,964 | McCormick | Jan. 21, 1919 |
| 1,898,219 | Sharp | Feb. 21, 1933 |
| 2,007,196 | Haugh | July 9, 1935 |
| 2,086,865 | Gustafson | July 13, 1937 |
| 2,131,028 | Goodsell | Sept. 27, 1938 |
| 2,135,952 | Stephens | Nov. 8, 1938 |
| 2,186,203 | Conteno | Jan. 9, 1940 |
| 2,296,103 | Haberkost | Sept. 15, 1942 |
| 2,298,667 | Weymouth | Oct. 13, 1942 |
| 2,408,944 | Miller | Oct. 8, 1946 |
| 2,439,330 | Zander | Apr. 6, 1948 |
| 2,442,506 | Morris | June 1, 1948 |
| 2,455,116 | Gittus | Nov. 30, 1948 |
| 2,462,302 | Bolsey | Feb. 22, 1949 |
| 2,462,823 | Woodward | Feb. 22, 1949 |

OTHER REFERENCES

Gately article in American Cinematographer, August 1, 1948, pages 267 and 278 to 281 inclusive.